June 30, 1925.  L. D. COLLAR  1,544,219

VALVE

Filed April 2, 1925

INVENTOR
LLOYD D. COLLAR
BY Hewey, Strong, Townsend & Loftus
ATTYS.

Patented June 30, 1925.

1,544,219

UNITED STATES PATENT OFFICE.

LLOYD D. COLLAR, OF OAKLAND, CALIFORNIA, ASSIGNOR TO COLLAR VALVE CORPORATION, OF OAKLAND, CALIFORNIA, A CORPORATION OF CALIFORNIA.

VALVE.

Application filed April 2, 1925. Serial No. 20,058.

*To all whom it may concern:*

Be it known that I, LLOYD D. COLLAR, a citizen of the United States, residing at Oakland, county of Alameda, and State of California, have invented new and useful Improvements in Valves, of which the following is a specification.

This invention relates to valves of the self-grinding type.

In general, valves of this type comprise a valve body in which the valve member is mounted in a manner permitting it to grind on its seat each time it is opened and closed. This insures perfect seating of the valve member and absolutely prevents leakage.

It is the principal object of the present invention to generally improve the construction and operation of valves of the type referred to.

One form which the invention may assume is exemplified in the following description and illustrated by way of example in the accompanying drawings, in which.

Figure 1:
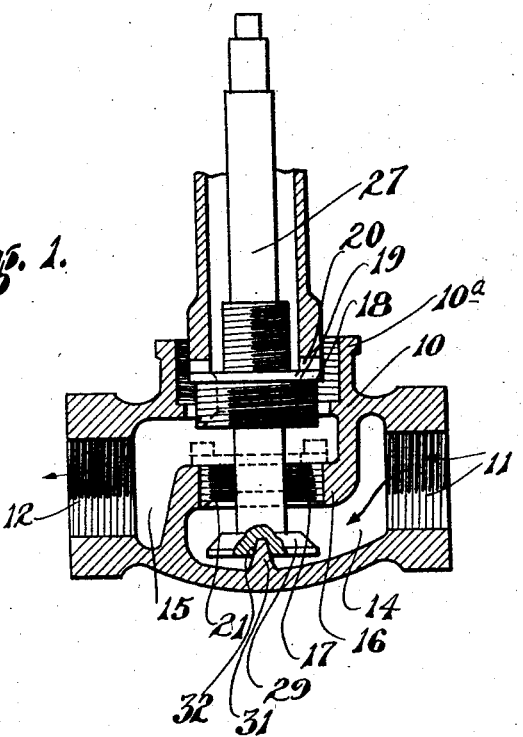
Fig. 1 is a longitudinal section through a valve body of my improved construction and showing the valve in the process of being assembled.

Referring more particularly to the accompanying drawings, I show a valve body 10 formed with an inlet opening 11 and a discharge opening 12, which communicate with inlet and discharge chambers 14 and 15 within the valve body. The inlet and discharge openings 11 and 12 are preferably arranged in axial alignment and are here shown as threaded for the reception of threaded ends of pipes. It may be preferred, however, to form flanges circumscribing these openings by which the valve may be connected to a pipe line.

The inlet and outlet chambers 14 and 15 are separated by a partition wall 16 which has a straight portion arranged on the axis of the inlet and discharge openings substantially midway therebetween. This partition wall is formed with a threaded aperture 17, the axis of which is at right angles to inlet and discharge openings. This aperture 17 is adapted to receive a removable valve seat member 18 which is exteriorly threaded so that it may be firmly threaded into place within the aperture 17. One end of the valve seat member 18 is formed with a circumscribing flange 19 which is adapted to seat against the surface of the partition wall when the valve seat member 18 is inserted into place. Projecting axially from this circumscribing flange on the valve seat member 18 are lugs 20, which may be engaged by a suitable tool to insert and thread the valve seat member into place in the aperture 17, or to unscrew and remove it therefrom. The valve seat member is formed with a central bore through which a valve stem 27 extends. The end of this bore at the end of the valve seat member 18 opposite the flange 19 terminates in a divergent valve seating face 21 for the reception of a divergent faced valve member 29 fixed at the end of the valve stem 27.

In axial alignment with the valve seat member 18 the valve body is formed with a bonnet receiving sleeve $10^a$ which extends at right angles to the axis of the inlet and discharge openings. This sleeve $10^a$ is bored and interiorly threaded to receive the threaded end of a substantially cylindrical valve bonnet 22. Intermediate the valve seat and the threaded bore in the bonnet receiving sleeve $10^a$ is an interior annular lip $22^a$ interposed between which and the end of the bonnet 22 is a thrust ring 23. It is apparent from Fig. 2 that when the bonnet is threaded into place in the valve body the thrust ring 23 will be securely clamped into position. This thrust ring is centrally bored to permit the valve stem 27 to reciprocate therethrough.

It should be here stated that the diameter of the bore in the valve body and the interior dimension of the annular lip $22^a$ is sufficient to allow the valve 29 and valve seat member 18 to be passed therethrough.

Figure 2:
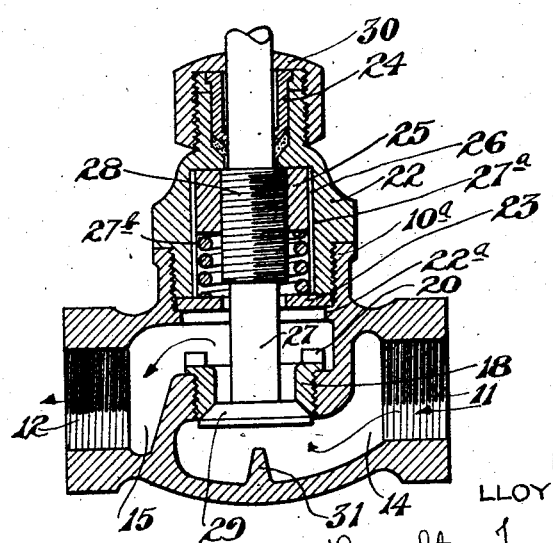
Fig. 2 is a similar section showing my improved valve completely assembled.

The bonnet 22 is formed with an enlarged bore which terminates short of the end of the bonnet as shown in Fig. 2 and continues in a smaller diameter through the outer end of the bonnet. This smaller bore receives a packing gland member 24.

Reciprocably mounted in the enlarged bore of the bonnet is a stem block 25. The opposite sides of the stem block are formed with longitudinal feathers 26 which are slidably received in grooves $27^a$ formed at the sides of the central bore. This mounting permits the stem block to reciprocate in the bore in the bonnet, but prevents it from rotating. A helical expansion spring 27^b is interposed between the stem block and the thrust ring 23 and constantly tends to maintain the stem block in its uppermost position. The packing gland member 24 which is arranged at the outer end of the bonnet 22 constitutes a guide for the valve stem 27. This valve stem is formed with an enlarged exteriorly threaded portion 28 which is threaded through the reciprocating stem block 25. At the inner end of the valve stem 27 a valve member 29 is formed for cooperation with the valve seat member 18 for controlling the flow of fluid through the inlet opening 11 to the outlet opening 12. From Fig. 2 it is apparent that the valve member 29 seats upwardly against the valve seat formed on the valve seat member 18. For preventing leakage through the bonnet around the valve stem a packing nut 30 is provided which threads on the end of the bonnet and cooperates with the packing gland 24 in maintaining packing tightly compressed around the valve stem, but permitting turning and reciprocation of the valve stem.

To operate the valve, assuming that the valve member 29 is seated against the seat formed in the valve seat member 18, rotation of the valve stem in one direction will tend to force the stem block 25 inwardly against the pressure of the spring 27^b. This will cause a grinding action between the meeting faces of the valve member 29 and the valve seat. Rotation of the valve stem in the other direction will thread the valve stem through the reciprocating stem block 25 to unseat the valve and establish communication between the inlet chamber 14 and the discharge chamber 15. It is apparent that when the stem is rotated to unseat the valve a grinding action will take place between the meeting faces of the valve member and seat until the stem block 25 abuts against the shoulder formed at the end of the central bore in the bonnet within which the stem block reciprocates.

The principal feature of the construction of the present valve is that it may be manufactured and assembled at a minimum expense. Prior to my invention it was impractical to provide a valve wherein the valve seated upwardly against the seat, so as to utilize the fluid pressure in aiding in maintaining the valve tight. This was due to the fact that it was necessary to form the valve bodies with an opening beneath the seat and through which opening the valve stem and valve were inserted during the assembling of the valve. Usually a plug was threaded into this opening to close it. Such formation or construction was undesirable, inasmuch as it was quite expensive to tap the valve body and to provide a threaded plug to close it. Also there was a liability of leakage around this plug. I have eliminated this disadvantage by constructing and arranging the elements of my valve in a manner permitting the entire valve to be assembled through the bonnet receiving sleeve 10^a on the valve.

I desire to call particular attention to a conical centering member 31 which is integrally formed with the valve body. This centering member 31 projects inwardly and is arranged coaxially with the valve member and is adapted to engage a conical bore 32 formed in the end of the valve member. In assembling the valve this centering member 31 maintains the valve member in correct position during the assembling of the other parts on the valve body, particularly when connecting the bonnet and its associated mechanism to the valve body. The centering member 31 and bore 32 in the end of the valve member also have an additional use, which is to prevent excessive opening of the valve. That is, to prevent the valve member from contacting with the valve body. Such contact is detrimental to the valve as it is liable to spring the same out of alignment.

In Fig. 1 I have shown a valve in the process of being assembled. It is seen that the valve stem and valve are first placed in position within the valve body, the valve member being projected through the aperture formed in the partition wall and held in correct position by the centering member 31 engaging the centering bore 32 in the end of the valve. The valve seat member is then placed over the valve stem at the upper end, passed through the bonnet sleeve 10^a, and threaded into place in the partition wall by means of a suitable tool engaging the lugs 20. By means of these lugs the valve seat member 18 may be threaded into the aperture in the partition wall until the annular flange 19 thereon firmly abuts against the face of the partition wall. When the valve member is in place leakage from the inlet chamber to the discharge chamber through the threads of the valve seat member is prevented.

It may be desired to form a press fit between the valve seat 18 and the aperture in the partition wall. In this case the valve would be first inserted through the aperture in the partition wall and the valve seat member 18 thereafter placed over the stem and pressed into place in the aperture in the partition wall.

When the seat member 18 is in place the thrust ring 23 is placed on the annular lip 22^a. The bonnet assembly, which includes the stem block 25 and the expansion spring, is then placed over the valve stem and the bonnet 22 is threaded into the bonnet receiving sleeve 10^a until it is in a position such as shown in Fig. 2. During the process of threadedly connecting the bonnet to the bonnet sleeve 10ª the stem block 25 will be threaded onto the threaded portion 28 of the valve stem. The packing gland 24 and the packing nut 30 are then positioned in place at the end of the pocket so as to form a leak-tight joint around the valve stem. When this has been done the valve is ready for use.

I desire to call particular attention to the fact that the valve member seats upwardly and opens against the pressure of the fluid flowing through the valve body. This is particularly advantageous as the pressure of the fluid aids in the grinding action of the valve against the seat.

From the foregoing it is obvious that I have provided a valve of improved construction and operation, which improved construction reduces manufacturing and assembling costs.

While I have shown the preferred form of the invention, it will be understood that various changes might be made in the combination, construction and arrangement of parts, without departing from the spirit of the invention as set forth in the appended claims.

Having thus described my invention what I claim and desire to secure by Letters Patent is:

1. A valve structure comprising a valve body having inlet and outlet openings, a wall intermediate said openings, said wall being formed with a valve aperture and seat, a bonnet sleeve on the body, a valve stem extending axially through said sleeve and valve aperture, a valve on the inner end of the stem to seat against the seat, to control said aperture, a bonnet mechanism adapted to be simultaneously connected with the sleeve and the valve stem, and means for maintaining the valve in correct alignment relative to the seat during the connection of the bonnet mechanism to the sleeve and valve stem.

2. A valve structure comprising a valve body having inlet and outlet openings, a wall intermediate said openings, said wall being formed with a valve aperture and seat, a bonnet sleeve on the body, a valve stem extending axially through said sleeve and valve aperture, a valve on the inner end of the stem to seat against the seat, to control said aperture, a bonnet mechanism adapted to be simultaneously connected with the sleeve and the valve stem, and means for maintaining the valve in correct alignment relative to the seat during the connecting of the bonnet mechanism to the sleeve and valve stem, said means comprising a projection extending inwardly from the valve body and engageable with a recess in the end of the valve.

3. A valve structure comprising a valve body having inlet and outlet openings, a wall formed intermediate said openings, said wall being formed with a valve aperture and seat, a bonnet sleeve on the body, a valve stem extending axially through said sleeve and said valve aperture, a valve on the inner end of said stem to seat against the seat to control said valve aperture, a bonnet having an enlarged bore in its inner end, a guided stem block reciprocably mounted in the bore, an enlarged threaded portion on the valve stem upon which the stem block may be threaded, a centrally bored thrust ring, an annular lip at the inner end of the sleeve and upon which said thrust ring may bear, an expansion spring between the stem block in the bore and the inner end of the bonnet, said bonnet being adapted to be connected with the sleeve simultaneously with the threading of the stem block onto the valve stem, and means for maintaining the valve in correct alignment relative to the seat during the connecting of the bonnet to the sleeve and the threading of the stem block onto the stem.

4. A valve structure comprising a valve body having inlet and outlet openings, a wall formed intermediate said openings, said wall being formed with a valve aperture and seat, a bonnet sleeve on the body, a valve stem extending axially through said sleeve and said valve aperture, a valve on the inner end of said stem to seat against the seat to control said valve aperture, a bonnet having an enlarged bore on its inner end, a guided stem block reciprocably mounted in the bore, an enlarged threaded portion on the valve stem upon which the stem block may be threaded, a centrally bored thrust ring, an annular lip at the inner end of the sleeve and upon which said thrust ring may bear, an expansion spring between the stem block in the bore and the inner end of the bonnet, said bonnet being adapted to be connected with the sleeve simultaneously with the threading of the stem block onto the valve stem, and means for maintaining the valve in correct alignment relative to the seat during the connecting of the bonnet to the sleeve and the threading of the stem block onto the stem, said means comprising a tapered projection extending inwardly from the wall of the valve body adapted to engage a tapered recess formed in the end of the valve.

5. A valve structure comprising a valve body having inlet and outlet openings, a wall intermediate said openings, said wall being formed with an aperture, a bonnet sleeve on the body, a valve stem extending axially through said sleeve and through said aperture, a valve on the inner end of the stem, said valve being of a diameter less than the diameter of the aperture, whereby it may be inserted therethrough, a centrally bored valve seat member adapted to be arranged over the stem and threaded into said valve aperture after the valve has been inserted through the aperture, said valve seat member having a valve seat for cooperation with the valve, a bonnet mechanism adapted to be simultaneously connected with the bonnet sleeve and the valve stem, and means for maintaining the valve in correct alignment relative to the seat during the connecting of the bonnet to the sleeve and valve stem.

6. A valve structure comprising a valve body having an inlet and outlet openings, a wall intermediate said openings, said wall being formed with an aperture, a bonnet sleeve on the body, a valve stem extending axially through said sleeve and through said aperture, a valve on the inner end of the stem, said valve being of a diameter less than the diameter of the aperture, whereby it may be inserted therethrough, a centrally bored valve seat member adapted to be arranged over the stem and threaded into said valve aperture after the valve has been inserted through the aperture, axially extending lugs formed at one end of the valve seat member whereby a tool may be inserted through the bonnet sleeve to thread said valve seat member into said aperture, said valve seat member having a valve seat for cooperation with the valve, a bonnet mechanism adapted to be simultaneously connected with the bonnet sleeve and the valve stem, and means for maintaining the valve in correct alignment relative to the seat during the connecting of the bonnet to the sleeve and valve stem, said means comprising a tapered projection extending inwardly from the wall of the valve body on the axis of the valve stem and engageable with a tapered recess formed in the end of the valve.

7. A valve structure comprising a body having inlet and discharge openings, a wall intermediate the openings, said wall being formed with an aperture, a bonnet sleeve formed on the body in axial alignment with said aperture, a valve stem extending axially through said sleeve and said aperture, a valve on the inner end of the stem, said valve being of a diameter less than the diameter of said aperture, a centrally bored valve seat member adapted to be arranged over the valve stem and passed through said sleeve and fixed in said aperture, an annular lip formed at the inner end of the bonnet sleeve, a centrally bored thrust member adapted to be arranged over the valve stem to bear on said lip, a threaded portion on said valve stem, a bonnet having an enlarged central bore in its inner end, a guided stem block reciprocably mounted in said bore, an expansion spring in the bore between said stem block and the inner end of the bonnet, said bonnet being adapted to be slipped over the end of the valve stem and threadedly connected with the bonnet sleeve simultaneously with the threading of the stem block onto the threaded portion of the valve stem whereby the spring will be interposed between the thrust member and the stem block and tend to maintain the latter in its outermost position, and a packing gland at the outermost end of the bonnet in which the valve stem is guided for rotation and reciprocation.

8. A valve structure comprising a body having inlet and discharge openings, a wall intermediate the openings, said wall being formed with an aperture, a bonnet sleeve formed on the body in axial alignment with said aperture, a valve stem extending axially through said sleeve and said aperture, a valve on the inner end of the stem, said valve being of a diameter less than the diameter of said aperture, a centrally bored valve seat member adapted to be arranged over the valve stem and passed through said sleeve and threaded into said aperture, lugs projecting axially from one end of the valve seat member whereby a tool may be arranged over the stem and inserted through the sleeve to thread said seat member into or out of said aperture, an annular lip formed at the inner end of the bonnet sleeve, a centrally bored thrust member adapted to be arranged over the valve stem to bear on said lip, a threaded portion on said valve stem, a bonnet having an enlarged central bore in its inner end, a guided stem block reciprocably mounted in said bore, an expansion spring in the bore between said stem block and the inner end of the bonnet, said bonnet being adapted to be slipped over the end of the valve stem and threadedly connected with the bonnet sleeve simultaneously with the threading of the stem block onto the threaded portion of the valve stem whereby the spring will be interposed between the thrust member and the stem block and tend to maintain the latter in its outermost position, and a packing gland at the outermost end of the bonnet in which the valve stem is guided for rotation and reciprocation.

9. A valve structure comprising a body having inlet and discharge openings, a wall intermediate the openings, said wall being formed with an aperture, a bonnet sleeve formed on the body in axial alignment with said aperture, a valve stem extending axially through said sleeve and said aperture, a valve on the inner end of the stem, said valve being of a diameter less than the diameter of said aperture, a centrally bored valve seat member adapted to be arranged over the valve stem and passed through said sleeve and fixed in said aperture, an annular lip formed at the inner end of the bonnet sleeve, a centrally bored thrust member adapted to be arranged over the valve stem to bear on said lip, a bonnet adapted to be arranged over the valve stem and threaded into said bonnet sleeve to bear against said thrust member, an enlarged bore in the inner end of said bonnet, a guided stem block reciprocably mounted in said bore, an expansion spring in the bore between said stem block and the inner end of the bonnet, said bonnet being adapted to be slipped over the end of the valve stem and threadedly connected with the bonnet sleeve simultaneously with the threading of the stem block onto the threaded portion of the valve stem whereby the spring will be interposed between the thrust member and the stem block and tend to maintain the latter in its outermost position, a tapered projection extending inwardly from the valve body on the axis of the valve stem, said projection being adapted to engage a tapered recess formed in the end of the valve when the valve is in full open position, such engagement being adapted to maintain said valve in alignment with the valve seat during the connecting of the bonnet to the sleeve and the stem block to the valve stem, and a packing gland at the outermost end of the bonnet in which the valve stem is guided for rotation and reciprocation.

10. A valve structure comprising a body having inlet and discharge openings, a wall intermediate the openings, said wall being formed with an aperture, a bonnet sleeve formed on the body in axial alignment with said aperture, a valve stem extending axially through said sleeve and said aperture, a valve on the inner end of the stem, said valve being of a diameter less than the diameter of said aperture, a centrally bored valve seat member adapted to be arranged over the valve stem and passed through said sleeve and fixed in said aperture, an annular lip formed at the inner end of the bonnet sleeve, a centrally bored thrust member adapted to be arranged over the valve stem to bear on said lip, a bonnet adapted to be arranged over the valve stem and threaded into said bonnet sleeve to bear against said thrust member, an enlarged bore in the inner end of said bonnet, a guided stem block reciprocably mounted in said bore, an expansion spring in the bore between said stem block and the inner end of the bonnet, said bonnet being adapted to be slipped over the end of the valve stem and threadedly connected with the bonnet sleeve simultaneously with the threading of the stem block onto the threaded portion of the valve stem whereby the spring will be interposed between the thrust member and the stem block, and tend to maintain the latter in its outermost position, and means to maintain the valve in correct alignment relative to the valve seat during the connecting of the bonnet to the valve body and the stem block to the valve stem.

LLOYD D. COLLAR.